(12) United States Patent
Rabinovich et al.

(10) Patent No.: US 8,584,114 B2
(45) Date of Patent: Nov. 12, 2013

(54) METHOD OF GENERATING AND DISTRIBUTING A COMPUTER APPLICATION

(75) Inventors: Zvi Rabinovich, Tel Aviv (IL); Eyal Rabinovich, Tel Aviv (IL); Tzach Hadar, Tel Aviv (IL); Dani Valevski, Tel Aviv (IL)

(73) Assignee: Mo'minis Ltd, Tel Aviv (IL)

( * ) Notice: Subject to any disclaimer, the term of this patent is extended or adjusted under 35 U.S.C. 154(b) by 313 days.

(21) Appl. No.: 12/993,254

(22) PCT Filed: Jun. 28, 2009

(86) PCT No.: PCT/IB2009/052777
§ 371 (c)(1),
(2), (4) Date: Nov. 18, 2010

(87) PCT Pub. No.: WO2010/001324
PCT Pub. Date: Jan. 7, 2010

(65) Prior Publication Data
US 2011/0066999 A1    Mar. 17, 2011

Related U.S. Application Data

(60) Provisional application No. 61/076,894, filed on Jun. 30, 2008.

(51) Int. Cl.
*G06F 9/44* (2006.01)
*G06F 9/445* (2006.01)

(52) U.S. Cl.
USPC ............ 717/171; 717/120; 717/168; 717/174

(58) Field of Classification Search
None
See application file for complete search history.

(56) References Cited

U.S. PATENT DOCUMENTS

| | | | | |
|---|---|---|---|---|
| 7,676,448 | B2 * | 3/2010 | Henderson et al. | 717/171 |
| 7,805,719 | B2 * | 9/2010 | O'Neill | 717/168 |
| 8,161,473 | B2 * | 4/2012 | Norrie | 717/174 |

(Continued)

FOREIGN PATENT DOCUMENTS

| GB | 2351574 A | 1/2001 |
|---|---|---|
| JP | 2005-346125 A | 12/2005 |

(Continued)

OTHER PUBLICATIONS

G. Deng, Resolving component deployment & configuration challenges for enterprise DRE systems via frameworks & generative techniques, May 2006, 4 pages.*

(Continued)

*Primary Examiner* — Thuy Dao
(74) *Attorney, Agent, or Firm* — D. Kligler I.P. Services Ltd.

(57) ABSTRACT

A processor is operative to store specifications of computer applications in a platform-independent language. A remote client device requests delivery of a specified application for execution thereon. The processor interrogates the remote client device to construct a device configuration, comprising characteristics and capabilities of the remote client device. The processor also obtains a user configuration, and establishes a compilation configuration according to the device configuration and the user configuration. A compiled application in binary format is produced using the compilation configuration and the platform-independent language of the specified application. The compiled application includes customized content and is adapted to run on the remote client device. The processor causes the compiled application to be downloaded to the remote client device.

27 Claims, 7 Drawing Sheets

(56) References Cited

U.S. PATENT DOCUMENTS

| | | | |
|---|---|---|---|
| 8,418,164 B2* | 4/2013 | Schneider | 717/168 |
| 2003/0105620 A1 | 6/2003 | Bowen | |
| 2004/0006688 A1* | 1/2004 | Pike et al. | 713/1 |
| 2004/0158577 A1 | 8/2004 | Chu et al. | |
| 2004/0250238 A1 | 12/2004 | Singh et al. | |
| 2006/0117294 A1* | 6/2006 | Vogler | 717/104 |
| 2006/0232662 A1 | 10/2006 | Otaka et al. | |
| 2007/0006150 A9* | 1/2007 | Walmsley | 717/120 |
| 2007/0208718 A1 | 9/2007 | Javid et al. | |
| 2007/0255792 A1 | 11/2007 | Gronberg | |
| 2008/0163192 A1* | 7/2008 | Jha et al. | 717/173 |
| 2010/0058317 A1* | 3/2010 | Braams | 717/171 |
| 2011/0154315 A1* | 6/2011 | Singh et al. | 717/171 |

FOREIGN PATENT DOCUMENTS

| | | |
|---|---|---|
| JP | 2006-178789 A | 7/2006 |
| JP | 2006-236323 A | 9/2006 |
| JP | 2007-310436 A | 11/2007 |
| WO | 2007056144 A2 | 5/2007 |
| WO | 2008031070 A2 | 3/2008 |

OTHER PUBLICATIONS

Lovstad et al., Run-time software configuration for mobile devices using an evolutionary quantifiable deployment model, Jun. 2008, 12 pages.*

Jansen et al., Evaluating the release, delivery, and deployment processes of eight large product software vendors applying the customer configuration update model, 2006, 4 pages.*

International Application No. PCT/IB2009/052777 Search Report dated Jan. 27, 2010.

European Application # 09772984 Extended Search Report dated Sep. 17, 2013.

* cited by examiner

METHOD OF GENERATING AND DISTRIBUTING A COMPUTER APPLICATION

CROSS-REFERENCE TO RELATED APPLICATIONS

This Application claims the benefit of Provisional Application No. U.S. 61/076,894, filed 30 Jun. 2008, which is herein incorporated by reference.

BACKGROUND OF THE INVENTION

1. Field of the Invention

This invention relates to software development, installation and management. More particularly, this invention relates to providing a computer application having a graphically displayable representation to a plurality of devices having different operating platforms and capabilities.

2. Description of the Related Art

The meanings of certain acronyms and abbreviations used herein are given in Table 1.

TABLE 1

Acronyms and Abbreviations

| | |
|---|---|
| API | Application Programmng Interface |
| GCC | Gnu Compiler Collection |
| GID | Game Identifier |
| GPS | Global Positioning System |
| GPU | Graphics Processing Unit |
| GUI | Graphical User Interface |
| HTTP | Hypertext Transfer Protocol |
| IP | Internet Protocol |
| ISP | Internet Service Provider |
| JAR | Java Archive |
| MMI | Man-Machine Interface |
| MOPAD | Mobile Telephone Application Distribution System |
| PDA | Personal Digital Assistant |
| URI | Uniform Resource Identifier |
| URL | Uniform Resource Locater |
| XML | eXtended Markup Language |

Mobile phones and personal digital assistants (PDAs), hereinafter referred to generically as mobile telephones, are marketed in a myriad of different hardware and software configurations and provide in addition to basic communication services a plethora of different functions. Mobile phones may be thin, thick, have large or small video screens and/or keyboards, cameras, GPSs and different graphical user interfaces (GUIs) to interface a user with the various functions that the telephones provide. And manufactures use different chipsets, different operating systems, and computer languages to implement the mobile telephone functions.

SUMMARY OF THE INVENTION

An embodiment of the invention provides an application distribution system for producing custom computer applications, including a processor, a memory accessible to the processor for storing programs and data objects therein, wherein execution of the programs causes the processor to store specifications of the computer applications in a platform-independent language, receive signals from a remote client device requesting delivery of a specified application for execution on the remote client device by a customer, interrogate the remote client device to construct a device configuration thereof, comprising characteristics and capabilities of the remote client device. The processor is further instructed to obtain a user configuration of the customer, establish a compilation configuration according to the device configuration and the user configuration, and apply the compilation configuration to the platform-independent language of the specified application so as to create a compiled application that is adapted to run on the remote client device and includes customized content responsive to the user configuration. The processor causes the compiled application to be downloaded to the remote client device.

The programs and data objects may further comprise a device repository including configurations of known types of remote devices, wherein interrogating the remote client device to construct the device configuration includes making a determination that the device repository lacks a known device configuration of the remote client device, and adapting the device repository to the device configuration by storing the device configuration therein.

The programs and data objects may further comprise a device fingerprinting subsystem, wherein interrogating the remote client device to construct the device configuration includes invoking the device fingerprinting subsystem to analyze the signals to identify device characteristics of the remote client device and responsively to the device characteristics to determine whether the remote client device can be associated with the known device configuration in the device repository.

In another aspect of the application distribution system, the programs and data objects may further comprise an application database storing respective device-independent application abstractions and compiled versions of the computer applications therein, an analysis module operative on the application abstractions to determine usages and dependencies of application objects thereof, a variables analysis module, a font analysis module, a background analysis module, and a skin analysis module. The processor is operative to invoke the variables analysis module to determine modification points in code of the application abstractions, invoke the font analysis module, to construct a text map of text that may be displayed by execution of the specified application, invoke the background analysis module to determine a need to reconfigure the specified application so as to comply with graphics capabilities of the remote client device in the device configuration, and invoke the skin analysis module to determine, responsively to memory capabilities of the remote client device in the device configuration, a need for pre-generation of rotated images for insertion thereof into data structures of the specified application.

According to a further aspect of the application distribution system, the programs and data objects further comprise a plurality of code generators that generate code acceptable for installation and execution on different types of remote devices, respectively, wherein applying the compilation configuration includes selecting, responsively to the compilation configuration, one of the code generators, and with the one code generator emitting the compiled application of the specified application.

The generated code may be native executable code for the remote client device, or may be an archive suitable for execution on the remote client device using a virtual machine.

The programs and data objects may further comprise a user fingerprinting subsystem, wherein the processor is operative to invoke the user fingerprinting subsystem to identify user characteristics of the customer and, responsively to the user characteristics, to select personalized content to be included in the compiled application.

According to still another aspect of the application distribution system, the processor is operative to invoke a patcher module to modify an existing compiled version of the specified application to conform the existing compiled version to requirements of the compilation configuration.

In yet another aspect of the application distribution system the processor is operative to identify functions in the compiled application that exceed a threshold size. The threshold size is determined according to memory limitations of the remote client device that are included in the compilation configuration. A function splitter module is invoked to divide the identified functions into smaller of code sections.

According to a further aspect of the application distribution system, the processor is operative to invoke a code obfuscation module to obfuscate at least a portion of the compiled application.

Other embodiments of the invention provide computer software products and methods for carrying out the processes of the above-described apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
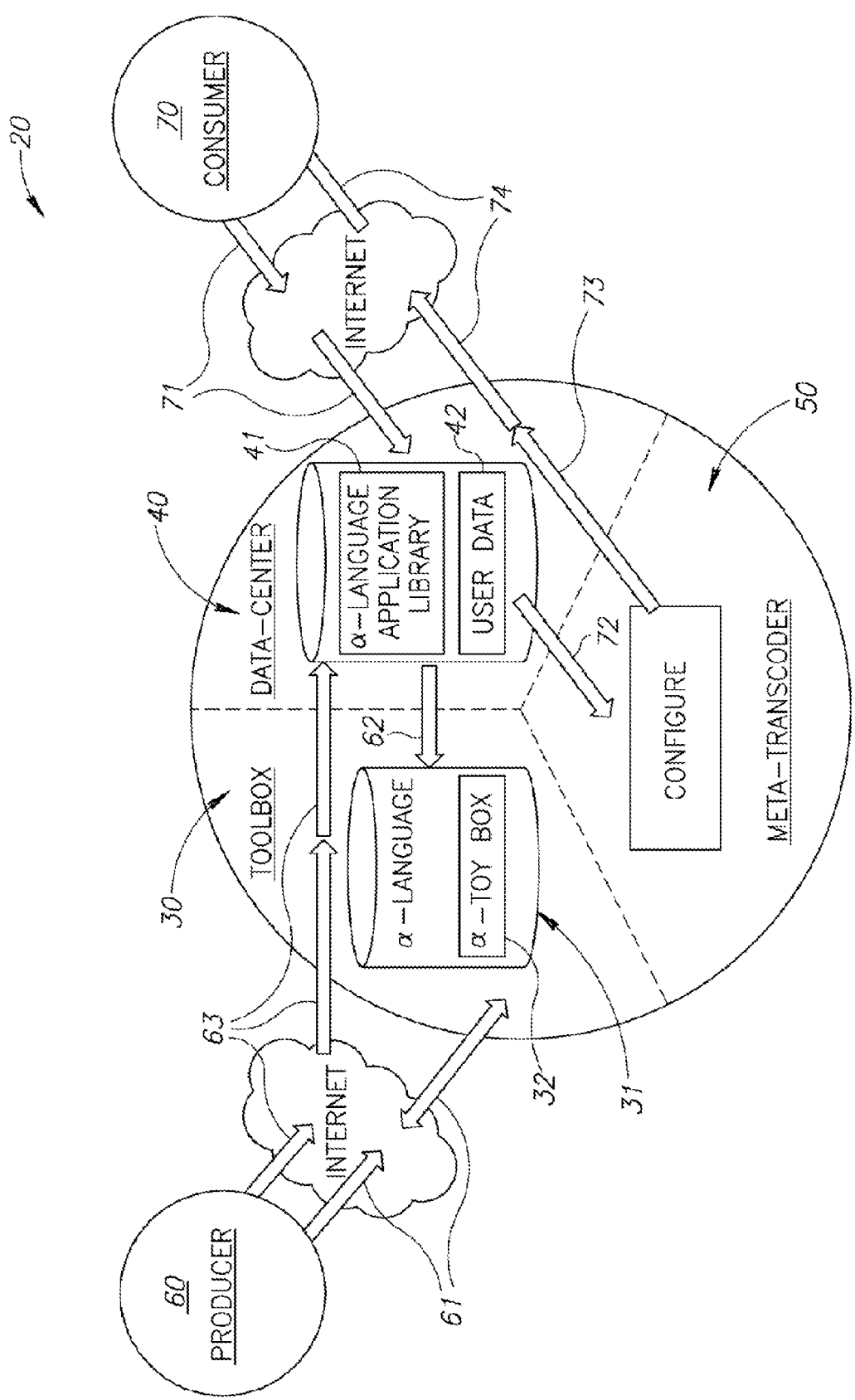
FIG. 1 schematically illustrates a system and its operation in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in permanent storage, such as a computer readable medium. In a client/server environment, such software programming code may be stored on a client or a server. The software programming code may be embodied on any of a variety of known tangible media for use with a data processing system, such as a diskette, hard drive, or CD-ROM. The code may be distributed on such media, or may be distributed to users from the memory or storage of one computer system over a network of some type to storage devices on other computer systems for use by users of such other systems.

Overview.

Among the different mobile telephone operating systems in use are: Symbian™, Linux®, Windows Mobile® and BREW® (Binary Runtime Environment for Wireless). In addition to the standardized operating systems, different vendors sometimes use proprietary non-standard operating systems on mobile hones that they provide.

Mobile telephone applications are programmed in, among other languages, C++, C, J2SE™, J2ME™ and .Net™. For convenience of presentation, a mobile telephone hardware and software configuration is referred to herein as a "mobile telephone platform" and includes the physical configuration of the telephone. Functionalities are typically exposed using vendor-specific APIs, which greatly hinders the porting of applications to different mobile telephones, as it requires a developer to learn the specific API of each type of mobile telephone that he intends to support.

As a result, a computer application, such as a computer game for use in a mobile telephone is typically configured and optimized for operation with a particular mobile telephone platform, or a relatively small number of mobile telephone platforms. It is not readily portable among a large number of different platforms. Lack of portability is a substantial barrier and limitation to widespread marketing of applications and games for mobile phones and is particularly limiting to small innovators, manufactures, and vendors who produce for and market to the mobile telephone market, or who are interested in penetrating the market.

In embodiments of the present invention, an application developer creates game applications by using a computer language, hereinafter referred to as an "alpha-language (α-language)", to create code for a computer application that is generic to a plurality of mobile telephone platforms and is translatable to code for the application that is executable on each of the platforms. The α-language is a high level, substantially human-legible language that is useable to describe and code operations for an application substantially without having to consider details of the mobile telephone platforms on which the application is expected to run. Typically the application developer creates game objects and rooms. An object is an audio and/or visual entity that changes responsive to events associated with the entity and is provided to a user of the application via a man machine interface (MMI).

Objects include but are not limited to animated characters, typically referred to as "sprites", which might be used in a computer game. An event is any stimulus associated with an object, which generates a change in the object. The change is referred to as an "action".

By way of a simple example, an object might be an image of a ball in a computer game.

An event associated with the ball might be collision with a wall. An action generated responsive to the event is a change in direction of motion of the ball upon collision with the wall. Another example of an event associated with the ball might be activation of a MMI component, such as a keyboard, mouse, or microphone that causes a change in a color of the ball. The change in color is referred to as an action responsive to activation of the MMI component. A room is an environment in which the ball exists. For example, a room might be four walls that contain the ball. In accordance with an embodiment of the invention, objects and rooms are generated using α-language substantially without reference to any particular mobile telephone platform on which the objects and rooms will operate.

An aspect of some embodiments of the invention relates to providing a mobile telephone application distribution system, hereinafter referred to by an acronym "MOPAD", operable to transcode and/or compile a program coded in the α-language to a computer language supported by each of the plurality of computer platforms.

According to an aspect of some embodiments of the invention, MOPAD comprises an application development "toolbox", a data center, and a meta-transcoder. The toolbox comprises the α-language and, optionally a graphical interface, referred to for convenience of presentation as an "α-toy box", which enables a user to program an application in the α-language by manipulating icons and animations. The data center comprises a library, hereinafter referred to as an "α-language application library", comprising α-applications and application components such as objects and accessories to objects created by users of the system.

Information, such as applications and application components, stored in the data center is available via the toolbox for developing applications. Optionally, the data center comprises personal data characterizing its users.

The meta-transcoder is adapted to configure an application stored in α-language in the data center to any of the plurality of mobile telephone platforms on which the application might be required to run. Configuring an α-language application for use on a given mobile telephone platform comprises translating the α-language encoding of the application to a language or binary format supported by the given mobile telephone platform and matching application parameters to the MMI configuration of the mobile telephone.

MOPAD and its components are optionally provided on a Web site and are accessed via a URL. For example, if a developer of content for mobile phones wants to create a mobile telephone application, e.g., a computer game, the developer might access the MOPAD URL to use the α-toy box to generate a program for the game in α-language. The generated game and/or components of the game are stored in the data center, optionally with data characterizing the game's developer, and as required suitable protection, such as copyrights and/or encryption, for the developer's intellectual property rights in the game. A customer is able to acquire the game for use on a mobile telephone by accessing the MOPAD URL and submitting a request to download the game that appropriately satisfies conditions, such as payment, that might be required for receiving the game. Upon receipt of the request, the meta-transcoder configures the game for use on the requester's mobile telephone by configuring the game to the requester's mobile telephone platform. The configured game is typically transmitted for use on the requester's mobile telephone, optionally by direct downloading or via email.

Turning now to the drawings, reference is initially made to FIG. 1, which schematically illustrates operation of a mobile telephone application distribution, system, i.e. MOPAD 20, in accordance with an embodiment of the invention.

MOPAD 20 can be regarded as having four major components:

(1) A game abstraction layer consists of a device-independent game descriptor, such as the α-language and application-specific resources. The α-language is a specialized language available from Mo'Minis, 14 Raoul Wallenberg Street, Tel Aviv 69719, Israel and may be used in the current embodiment. Game specifications are sometimes described herein with reference to the α-language. However, the principles of the invention may be equally practiced with other game descriptor languages.

(2) Application authoring tools are used to manipulate the game abstraction layer in order to rapidly create applications.

(3) A code generation system is responsible for generating user specific and device specific code, and patching existing games.

(4) A data center is responsible for managing the content, handling application delivery and on-the-fly adjustments, managing client's accounts and exposing other services.

By way of example, MOPAD 20 is shown interacting with and providing services to a producer 60 of an application, optionally a computer game, for use on mobile phones and a consumer 70 of content for use on a mobile telephone. MOPAD 20 is provided on a suitable Web site. Producer 60 and consumer 70 access MOPAD 20 via the Internet.

MOPAD 20 optionally comprises a toolbox 30, a data center 40, and a meta-transcoder 50. Toolbox 30 comprises an instruction set 31 stored on a computer readable medium for using a high level, substantially human-legible α-language for describing and coding an application for use on a mobile telephone. Optionally, instruction set 31 comprises a graphical interface, an α-toy box 32, which enables a user of MOPAD 20 to program a mobile telephone computer game with the α-language by manipulating icons and animations optionally accessed via menus. Data center 40 comprises an α-language library 41 of applications and components, for example program sub-routines, for mobile telephone applications that may be used and incorporated by a producer in applications the producer produces. Data center 40 optionally comprises user data 42, such as personal data and preferences that characterizes users of MOPAD 20 and enable MOPAD 20 to tailor services and/or content that it provides to its users.

In FIG. 1 producer 60 is shown accessing toolbox 30 of MOPAD 20 via the Internet to use and/or download material in instruction set 31 for developing the game the producer intends to develop. Development may be done on-line and offline in many combinations. Double arrow block arrows 61 schematically represent producer 60 accessing toolbox 30 via the Internet and downloading from MOPAD 20 suitable instructions for using α-language. Additionally or alternatively, the producer 60 may operate in real time with α-toy box 32 to describe and encode a computer game for use on mobile phones.

During programming with the α-language, either by writing code in the language and/or using α-toy box 32, toolbox 30 optionally provides producer 60 with access to applications and application components comprised in α-language library 41 of data center 40. Access to the library is indicated by a block arrow 62 and allows producer 60 to use and incorporate suitable material, for example animation subroutines for animating a sprite, from the library in the game the producer is creating. Upon completion of describing and coding the game in the α-language, the α-language code is transmitted for storage by data center 40 in α-language application library 41. Block arrows 63 schematically indicate transmission of the game's α-language code for storage in the α-language library.

In accordance with an embodiment of the invention, mobile telephone applications, such as the game created by producer 60, that are stored in data center 40 are optionally profiled for distribution by their respective owners. For example, an owner may profile an application stored on data center 40 for sale in exchange for payment of a fee or for distribution as freeware. An owner may additionally or alternatively limit acquisition of an application to a particular segment of the population or to persons specifically authorized by the owner to acquire the application. Applications for distribution are optionally suitably published to bring them to the attention of consumers.

Assume by way of example that the game produced by producer 60 is to be made available for sale to the public. The game is suitably published by MOPAD 20 on the Internet to bring it to the attention of potential customers, and consumer 70 sees the publication and is interested in purchasing the game for use on his or her mobile telephone. The consumer transmits a request for the game to MOPAD 20 via the Internet. Block arrows 71 schematically represent submission of the request. The request optionally includes credit card information for making payment for the game and characterizing information that characterizes the consumer.

Characterizing information optionally comprises personal preferences, for example preferred color schemes, which the consumer specifies for tailoring the game to his or her tastes.

Optionally, characterizing information comprises personal information gleaned responsively to the model of mobile telephone being used, geographical location of the consumer and information that may be acquired from the consumer's mobile telephone service provider. Upon receipt of the request, data center 40 automatically interrogates the mobile telephone of consumer 70 to determine a profile of the platform that supports the telephone's functions and locates the α-language program for the game in its application library. Optionally, the profile is determined using a user agent uniform resource identifier (URI) associated with the telephone and user agent ID fields of the download request made by the mobile telephone.

Data center 40 transmits, as schematically indicated by a block arrow 72, the mobile telephone platform profile, the α-language program, and the preferences of consumer 70 to meta-transcoder 50. The meta-transcoder configures the α-language program for the game for running on the consumer's mobile telephone responsive to the platform profile and the consumer preferences, and as indicated by a block arrow 73 returns the configured program optionally to data center 40. Optionally, characterizing information is incorporated directly into the configured program to adapt the configured program to the consumer preferences and/or profile. Data center 40 optionally directly downloads the configured game to the mobile telephone of consumer 70 via the Internet. Block arrows 74 schematically represent downloading of the game.

Figure 2:
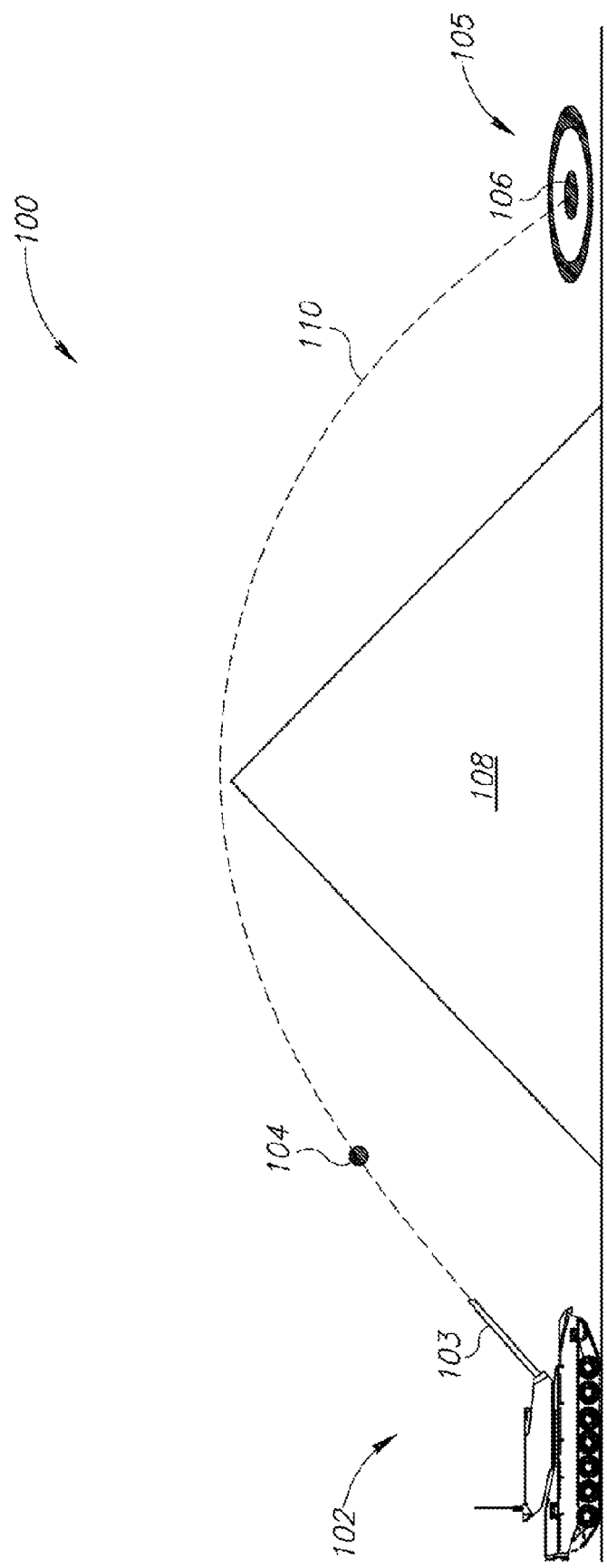
FIG. 2 schematically illustrates a computer game to be described and coded in α-language, in accordance with an embodiment of the invention.

Reference is now made to FIG. 2, which schematically shows an image of a very simple computer game 100 to illustrate describing and coding an application in α-language for operation on mobile phones, in accordance with an embodiment of the invention.

Game 100, by way of example, is a shooting game entitled "tank-target". The game comprises four objects suitably represented by a visual and/or audio entity presented on the mobile telephone video screen and/or speaker: a tank 102 having a cannon 103; a shell 104 that the cannon can be triggered to fire; a target 105 having a center 106; and a mountain 108 located between the tank and the target. Tank cannon 103 can be aimed at various elevation angles to fire shell 104 at different, selectable muzzle velocities, and once fired, the shell follows a parabolic trajectory 110 determined by the elevation angle, muzzle velocity, gravity, and conventional kinematics.

The challenge of the game is to set the muzzle velocity and aim cannon 103 at an elevation angle so that shell 104 clears mountain 108 and hits center 106 of target 105. If the shell doesn't clear the mountain, it may self-destruct in an explosion when it collides with the mountain. If the shell hits the target, optionally, the shell explodes and the target is replaced by a smaller, more difficult to hit target. Player success level is determined by how small a target the player can control the cannon to hit.

In accordance with an embodiment of the invention, each object is a state machine defined by a set of events that it responds to and changes, (referred to as noted above, as "actions") that the object undergoes in response to the events. For example, the tank is defined by events, which are commands that set the elevation angle for cannon 103, the muzzle velocity of shell 104 that it fires, and a command that cause the cannon to fire.

The "command-events" are input to the game by a player operating a MMI (not shown) of the mobile telephone platform on which the game runs. For example, increasing or decreasing cannon 103 elevation angle is optionally performed by a "left event" or a "right event" respectively. The left or right event may be effected by the player suitably operating the MMI of the mobile telephone, for example by depressing a left or right direction button respectively on a keyboard of the MMI. Similarly, the muzzle velocity is increased or decreased responsive to "up" or "down" events, optionally mediated by the player depressing an up or down direction button on the keyboard. Firing cannon 103 is accomplished responsive to a "fire event" optionally executed by depressing an enter button or space bar on the keyboard.

However, mobile telephone platforms do not all have a same MMI comprising a same keyboard, and different MMIs will typically have different keyboard configurations and often keyboard buttons having different functions. A mobile telephone MMI, such as that of the iPhone™, may not even have a keyboard. Therefore, in accordance with an embodiment of the invention, the α-language does not define events and/or actions for a specific mobile telephone platform or MMI but provides language and syntax that are substantially generic to a plurality of mobile telephone platforms. The descriptions and definitions that define objects in the α-language application are readily transcoded to tailor the application for execution on a given mobile telephone platform of the plurality of such platforms.

It is noted that whereas the α-language does not code for a specific mobile telephone platform, α-toy box 32 optionally comprises graphical images of MMI components, such as a graphical image of a keyboard or a video screen, for manipulation in generating α-language code, and such graphical images inherently have specific visual geometries. However, the graphical images are visual aids whose specific features do not constrain an application written in α-language to the visual geometry of the graphical images. In general, a specific visual feature of a visual aid is a representation not of itself, but of a semantic, which is understood by and translatable by meta-transcoder 50 to any of a plurality of mobile platform codes so that the meaning of the semantic is preserved.

For example, it is noted above that increasing or decreasing elevation angle of cannon 103 is optionally mediated by depressing a left or a right direction button respectively.

Optionally an image of a "keyboard aid" in the α-toy box 32 might be configured with a right and a left direction button, which are used to indicate decreasing an increasing elevation angle respectively. However, meta-transcoder 50 does not "understand" the left and right direction buttons as left and right buttons per se, but as representative of, respectively, the semantic "increasing" and the semantic "decreasing". If a mobile telephone platform on which the tank target (center 106) is to run does not comprise direction buttons that might be used for increasing and decreasing elevation angle, meta-transcoder 50 might transcode "increasing" and "decreasing" to depressing keys 1 and 2 respectively of a keyboard that the platform does comprise.

By way of example of an α-language code for an application, in accordance with an embodiment of the invention, the code portions of Listing 1 show exemplary α-language code for objects of tank-target game 100 (tank 102, shell 104, center 106, mountain 108) as shown in FIG. 2. Listing 1 encodes logic for the objects as state machines, which logic controls the objects' responses to events that occur during the game. For convenience of presentation, α-language code defining graphics of the objects and possible audio effects are not listed. Shell 104 is referred to as "cannonball" in the code.

It is noted that whereas the α-language code for tank-target game 100 below exhibits a specific syntax, an α-language may be configured different from that shown below and the invention is not limited to the specific α-language code shown for tank-target. Different α-languages and game descriptor languages will readily occur to a person having ordinary skill in the art.

Game Creation Process.

Referring again to FIG. 1, upon demand, a game descriptor is converted by the MOPAD 20 into a valid application, ported according to pre-defined handset properties. Games and content are developed on top of a platform independent content descriptor, the game abstraction layer. The server-side architecture enables platform independent development and seamless porting, achieving backward and forward compatibility of the created content.

A brief discussion of the game abstraction layer will facilitate an understanding of the principles of the present invention, as the game abstraction layer defines the most basic building blocks supported by the platform. This layer is responsible for storing all the information required for the definition of the content. While the actual implementation of the content may differ dependent on the logic residing in other layers, the game abstraction layer defines the "playground", i.e., the game elements, such as games and rooms, and their properties, background image, background sound, menu items and their colors, and specifies the behavior of the resulting content.

Using a standardized data object module at its root, the game abstraction layer allows for the easy implementation of many studios, editors and wizards for content development. Writing a specialized wizard for creating ordinary greeting cards, action games, or applications of any specific genre can be done in a short time, without making any changes to the server-side infrastructure. This standard also supports easy extension of capabilities when such appear, e.g., GPS, advanced networking, and MMI capabilities. The game abstraction layer includes rooms and objects, which have been noted above. In order to translate a game from one language to another, the game abstraction layer includes full Unicode support, including right-to-left languages, and facilities for extraction and updating of language-related data.

Data Center.

The data center 40 has several major responsibilities: (1) aggregating content-related data and developer accounts; (2) handling download and on-the-fly generation process; (3) managing centralized end user accounts; and (4) exposing a service layer using various APIs.

The present invention is largely concerned with item (2). It is assumed that games and other applications will have been produced by developers, using the above-described game abstraction layer, and typically using the α-language. The game or application has now been requested by an end user, operating a remote device, such as a mobile telephone. The following paragraphs provide a high level description of the download process.

Figure 3:
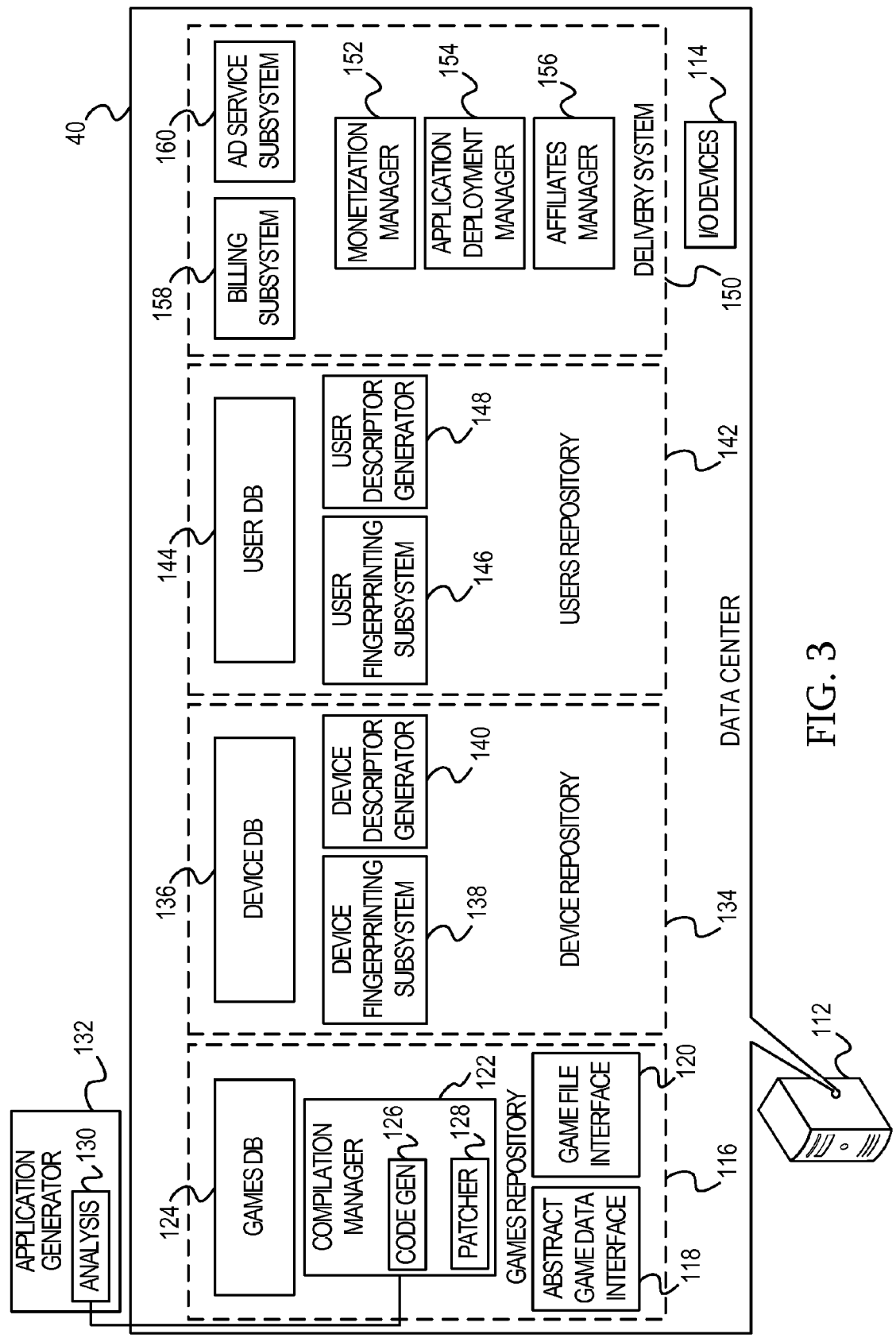
FIG. 3 is a block diagram of a data center in the system shown in FIG. 1, in accordance with a disclosed embodiment of the invention.

Reference is now made to FIG. 3, which is a block diagram of the data center 40 (FIG. 1). The data center 40 typically comprises a general purpose or embedded server 112 or other computer processor, which is programmed with suitable memory and software for carrying out the functions described hereinbelow. Thus, although portions of the data center 40 shown in FIG. 3 and other drawing figures herein are shown as comprising a number of separate functional blocks, these blocks are not necessarily separate physical entities, but rather may represent, for example, different computing tasks or data objects stored in a memory that is accessible to the processor. These tasks may be carried out by a computer program running on a single processor, or on multiple processors. The functional blocks shown may be organized as distinct software modules of the computer program. The software may be provided to the processor or processors on tangible media, such as CD-ROM or non-volatile memory. Alternatively or additionally, the data center 40 may comprise a digital signal processor or hardwired logic.

Furthermore, the data center 40 may have I/O devices 114 for reproducing computer instructions for carrying out the functions thereof by forming transitions in a tangible computer-readable medium, the transitions comprising digital patterns that are interpretable by another computer as instructions or data.

Included in the data center 40 is a games repository 116, which stores compiled games and uncompiled game-related data and programs, referred to herein as "abstract game data". It exposes an interface 118 for submitting and retrieving the abstract game data and an interface 120 for retrieving and updating compiled game files. The latter interface is tightly coupled with the game generation process. The games repository 116 also includes a compilation management module 122, and a games database 124 that stores versions of previously compiled games for different remote devices. The compilation management module 122 includes a code generation section 126 and a patcher 128. The compilation management module 122 cooperates with an analysis section 130, which in the current embodiment is located external to the data center 40 in a supervisory entity, application generator 132. However, in some embodiments, the analysis section 130 could be included in the data center 40 for convenience of implementation. The functions of these modules are described below The interface 118 deals with compiled game descriptors based on two arguments: (1) GID—a globally unique game identifier; and (2) CompilationConfiguration—a configuration consisting of various parameters used to compile a game. This configuration is usually constructed from two other objects: a device configuration and a user configuration.

A device repository 134 maintains configurations of client devices, i.e., mobile telephones, in a device database 136. The device repository 134 includes a device fingerprinting subsystem 138 and a device descriptor generator 140, both described below.

When the games repository 116 receives an electronic compilation request from a client, the following actions take place automatically: A device configuration of the requesting client is retrieved or constructed. Device configurations are maintained as parameters of a CompilationConfiguration class in the device repository 134.

A user repository 142 maintains user (customer) configurations that are included in the CompilationConfiguration parameter. User configurations are stored in a user database 144, and are identified with the aid of a user fingerprinting subsystem 146. If a needed user configuration does not exist in the user database 144, or cannot be reliably identified using by the user fingerprinting subsystem 146, it is generated by a user descriptor generator 148.

If a previously compiled game in the games database 124 satisfies the requirements of the CompilationConfiguration parameter, then it is retrieved from the games repository 116. Otherwise, a compilation configuration instance, specified by the CompilationConfiguration parameter, is composed using the device and user configurations. A compilation request is then generated and executed by the compilation management module 122. The compiled game is added to the games database 124, and delivered via the interface 120.

The games database 124 comprises four tables. Listing 2 presents a record format used to identify the game and its history generally. Listing 3 presents a record format that holds data related to delivery of a game. Listing 4 is a record format that describes a cache of compiled games for each game and build configuration. Listing 5 is a record describing build configurations, in which the field "configuration" is a composite of user configuration and device configuration information.

The games repository 116 is flexible, and can apply some modifications to the requested game without full recompilation, e.g., replacement of images, and replacement of external metadata. An example of such metadata is player level information. Such on-the-fly modifications can be accomplished much more quickly than recompilation, and without burdening the games repository 116 with large amounts of data that would be required to be stored were such minor variations individually maintained. The modifications are applied by the patcher 128. Avoiding recompilation by use of the patcher 128 saves considerable time.

Finally, the compiled, patched or retrieved game is returned to the requesting entity by a delivery system 150. Components of the delivery system 150 include a monetization manager 152, an application deployment manager 154, an affiliates manager 156, a billing subsystem 158, and an advertising service subsystem 160.

Device Repository.

Figure 4:
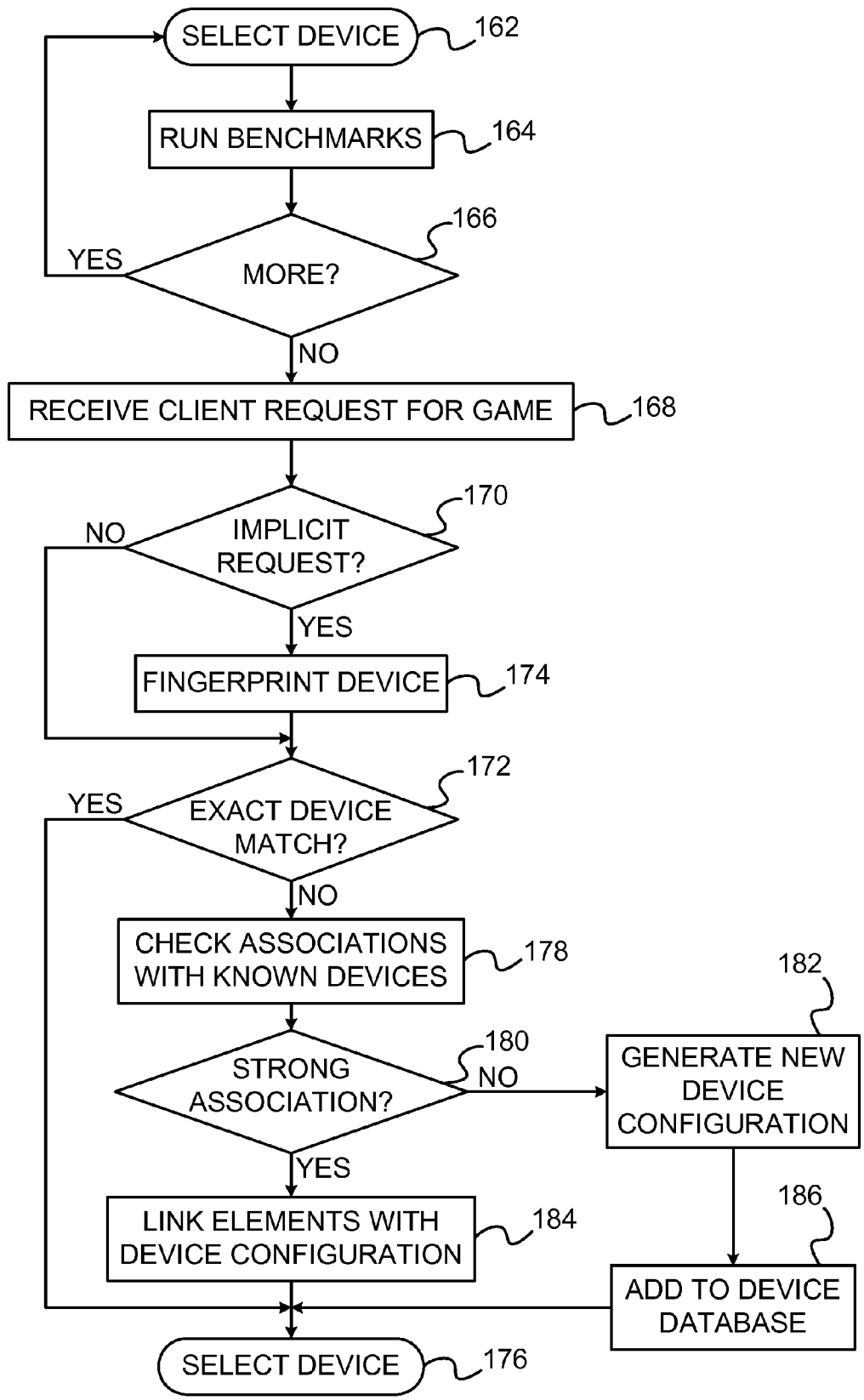
FIG. 4 is a flow chart of a process executed in the data center shown FIG. 3, in accordance with a disclosed embodiment of the invention.

The device repository 134 is responsible of generating a device configuration for a requesting client. Reference is now made to FIG. 4, which is a flow chart of a process automatically executed by the device repository 134 (FIG. 3) for constructing the device database 136 in accordance with a disclosed embodiment of the invention. The device database 136 holds a common device configuration for every family of devices, i.e., one or more similar devices from which all members of a family derive. When a new device configuration is constructed it is automatically added to an existing family group and inherits the group's properties. The generated device properties may be subsequently overridden with more accurate values when they become available.

The device database 136 comprises three tables. Listing 6 is a record format for device configuration data. Listing 7 is a record format that maps device identifiers to known issues. Listing 8 is a record format that concerns known device issues.

At initial step 162, a device is selected, usually a model of a mobile telephone. Then, at step 164 A device configuration for the currently selected device is built, by running benchmark and application tests in order to discover various characteristics of that device, e.g., GPU 2-dimensional capabilities, size of display screen, keyboard layout, and size of memory. In some embodiments the tests are run off-line, on a different specimen of the device. However, it is possible to interrogate the actual requesting device "on-the-fly". This option is particularly useful when a very new release of a device or an obsolete device is encountered. In such cases obtaining a separate specimen of the device within a reasonable time to satisfy the customer request may be infeasible.

Control now proceeds to decision step 166, where it is determined if more devices need to be processed. If the determination at decision step 166 is affirmative, then control returns to initial step 162.

If the determination at decision step 166 is negative, then control proceeds to step 168, where a client request for an application to be downloaded to a specific device is received. The request could be explicit or implicit. An implicit request is usually executed when the end user directly browses a specific link and requests to receive an application via that link.

Control now proceeds to decision step 170, where it is determined if the client request is implicit. If the determination at decision step 170 is negative, then control proceeds to decision step 172, which is described below.

If the determination at decision step 170 is affirmative, then control proceeds to step 174. When servicing an implicit request, the device repository 134 invokes the device fingerprinting subsystem 138 (FIG. 3) to identify the requesting device automatically.

The device fingerprinting subsystem 138 identifies at least the following characteristics of a remote client device: the browser's user agent; the user agent profile; and the user agent profile URL. The device fingerprinting subsystem 138 attempts to map these elements one-by-one to a device configuration stored on the device database 136. The client request is typically received as a HTTP request, which is parsed and inserted into a Device ID data structure containing the user agent profile URI. The URI is included in the HTTP header, and points to the user agent profile, which is generally a XML document containing various parameters of the device. The device fingerprinting subsystem 138 performs an initial analysis of the XML document and extracts relevant parameters in order to better identify the device. For example, the device vendor name, for example is normally included in the user agent profile The model of the requesting device is included if available. These alone may enable an identification of the requesting device.

Control now proceeds to decision step 172, where it is determined if an exact match with a known device configuration was found. If the determination at decision step 172 is affirmative, then control proceeds to final step 176, which is described below.

If the determination at decision step 172 is negative, then control proceeds to step 178, where associations are evaluated between the information determined by the device fingerprinting subsystem 138 and corresponding elements in the device database constructed in initial step 162 and step 164. This is done by checking for a mapping between the user agent profile URI and a known device configuration. Flexibility at this step may be enhanced by using regular expressions to identify the mapping.

Control now proceeds to decision step 180, where it is determined if a mapping has been found is found in step 178. If the determination at decision step 180 is negative, then control proceeds to Step 182, which is described below.

If the determination at decision step 180 is affirmative, then control proceeds to step 184, where all the other client in the request elements are associated with the device configuration identified in step 178 and decision step 180. In this manner, the device database can be updated with new information whenever a user requests to download an application. Optionally, heuristic methods may be used for linking elements to a specific device. For example, textual similarities between user agent profiles of the requesting device and known devices may be exploited. The device associated with the current device configuration is selected for download in final step 176.

Step 182 is performed when the device repository 134 (FIG. 3) fails to identify a device in any of the foregoing steps. The device is interrogated. The device repository 134 retrieves the user agent profile, which is typically expressed in a XML file. The user agent profile is parsed, and used by the device descriptor generator 140 (FIG. 3) to compile a new device configuration. As much information as possible is extracted from the user agent profile, including the following categories: (1) Screen size; (2) Bits per pixel; (3) Runtime environment (if it exists), to include (a) Operating System name, (b) Operating System version, (c) Java Enabled (yes/no), (d) JVM version (if applicable), (e) Supported Bluetooth® version; (4) Vendor name, (5) Model name; and (6) Supported languages.

The device database 136 is again consulted to match the new device profile as closely as possible to an existing device profile. Missing details in the new device profile can often be added in this manner. Optionally, the new device profile may be supplemented by information obtained from external benchmarking programs, such as JBenchmark, available via SourceForge.net. The new device configuration is then added to the device database 136 at step 186. The new device is then selected at final step 176.

User Repository.

Reverting to FIG. 3, the user repository 142 holds configuration information for individuals and groups that are later used to personalize content during creation of an application. A user configuration holds properties such as: locality parameters, e.g., languages; content related parameters, e.g., color scheme preferences; personal information, e.g., contacts, user name; and channel and region-specific prerequisites, e.g., digital signatures, certificates.

User configurations are saved in the user database 144, and extracted in a similar manner to the device configurations described above, either implicitly or explicitly. When extracted implicitly the user configuration is associated with the request using one of the following:
 (1) identifiers provided by the user, e.g., account identifier;
 (2) source IP address, used for determining the country and ISP of the user; and
 (3) identifiers provided by third parties.

In addition, information derived from the device may reveal additional user information, which can be incorporated into the user database 144, preferably associated with a confidence indicator. For example, it may be inferred that a user of a Blackberry® device is likely to be a 25-50 year old man who works in a large corporation or a government agency. The user database 144 comprises one table, holding a list of registered users. Its record format is given in Listing 9.

The process of dynamic compilation described in detail below enables the embedding of user specific data into the generated application.

Delivery.

The delivery process is orchestrated by the data center 40, and involves the components mentioned above. A peer-to-peer distribution mechanism, combined with the ability to embed user-specific content, enables collection of user community-oriented data.

Figure 5:
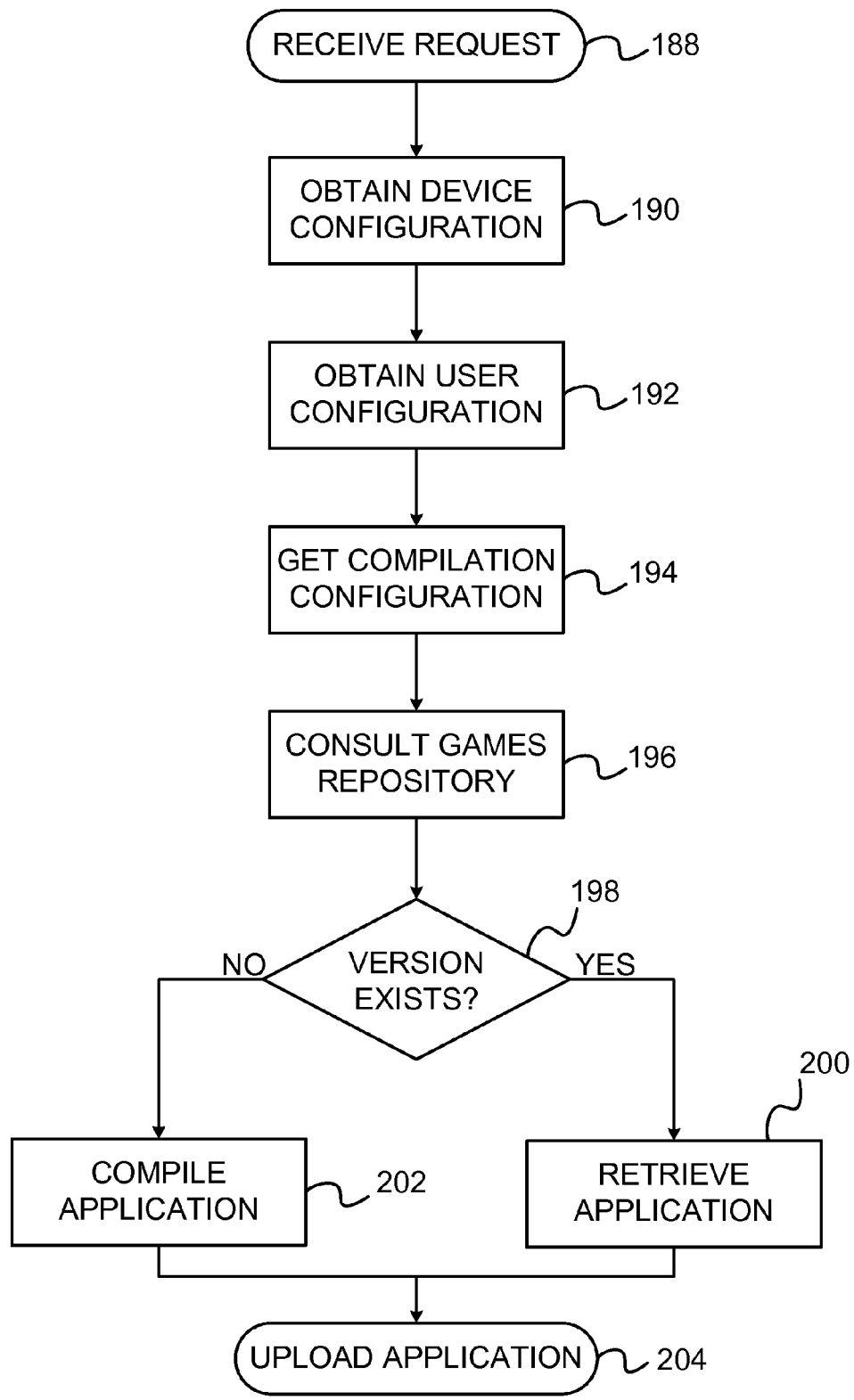
FIG. 5 is a flow chart illustrating a process of providing a compiled application to a requesting device in accordance with a disclosed embodiment of the invention.

Reference is now made to FIG. 5, which is a flow chart illustrating a process of providing a compiled application to a requesting device in accordance with a disclosed embodiment of the invention.

At initial step 188, the requesting device accesses the data center 40, typically via the Internet, or other suitable communications channel.

Next, at step 190, the device repository 134 is consulted to obtain a device configuration for the requesting device. A device configuration is retrieved or a new one generated by performing the method described with respect to FIG. 4, beginning at step 168. The details are not repeated in the interest of brevity.

Next, at step 192, the user repository 142 is consulted to obtain a user configuration. The procedure is similar to that in step 190. If the user of the requesting device cannot be identified, a default user profile is generated, subject to modification if additional information about the user becomes available through further interaction with the data center 40, or as information acquired from other sources. The default profile usually includes modifications based on information available in the HTTP request, such as the IP address of the requester.

Next, at step 194 the user and device configurations are submitted to the compilation management module 122, which constructs a compilation configuration from the two.

Next, at step 196 a request to the games repository 116 is made with two arguments: the user configuration and the device configuration.

Control now proceeds to decision step 198, where it is determined if the required version of the application exists in the games repository 116.

If the determination at decision step 198 is affirmative, then control proceeds to step 200, where an existing version is retrieved.

If the determination at decision step 198 is negative, then control proceeds to step 202. A new version of the application is compiled at the direction of the compilation management module 122, by transmitting a "GetCompiledApp" message to a compiler that is appropriate for the requesting device. For example, for some devices a Java compiler and packager may be invoked to create a JAR file or other archive suitable for execution using in a virtual machine on the client device. Alternatively, native executable code may be generated using a compliant c++compiler, e.g. GCC. This is appropriate, for Symbian™-based mobile telephones, e.g., Nokia 6120c, Nokia 6600. Alternatively, the patcher 128 may modify a pre-existing version, if the differences between the pre-existing version and the required version are relatively small. This is determined by the compilation management module 122 by reference to the device configuration and the compilation configuration.

After performing step 202 or step 200 the compiled application is uploaded to the requesting device at final step 204.

Compilation.

This section describes the compilation procedure of step 202 (FIG. 5) in further detail.

Referring again to FIG. 3, a process of parsing commences immediately when a game abstraction file is received by the games repository 116, typically as a XML file and is expressed in a game descriptor language, e.g., the above-noted α-language. It will be recalled from the preceding discussion that this file is a product of the game abstraction layer. The games repository 116 is responsible for parsing the file into a memory representation that support efficient querying of information and for validation of the abstraction.

Once the parsing is complete a process of "shallow" validation takes place. The "shallow" validation process is responsible of verifying that game descriptor is unimpaired. It is directed to, e.g., finding broken references, and checking for corrupted data. Shallow validation is to be distinguished from, another form of validation, referred to as "deep" validation, which may take place during creation of the game, where game logic is validated. Deep validation includes a determination that the game uses reasonable speeds, locations, etc. Deep validation is typically performed by authoring tools.

Unlike deep validation, shallow validation at the compilation stage assumes a fully functional game. Therefore shallow validation is very strict, regarding every error raised as critical.

Multiphasic Analysis.

After successful parsing and validation, analysis of the game abstraction file is orchestrated by the application generator 132, which invokes the compilation management module 122, and the analysis section 130. A series of specialized analyzers scan the parsed data structures of the received game abstraction file and perform an in-depth analysis to facilitate optimal code generation. This step is critical in view of the limited resources typically available to mobile telephones.

Figure 6:
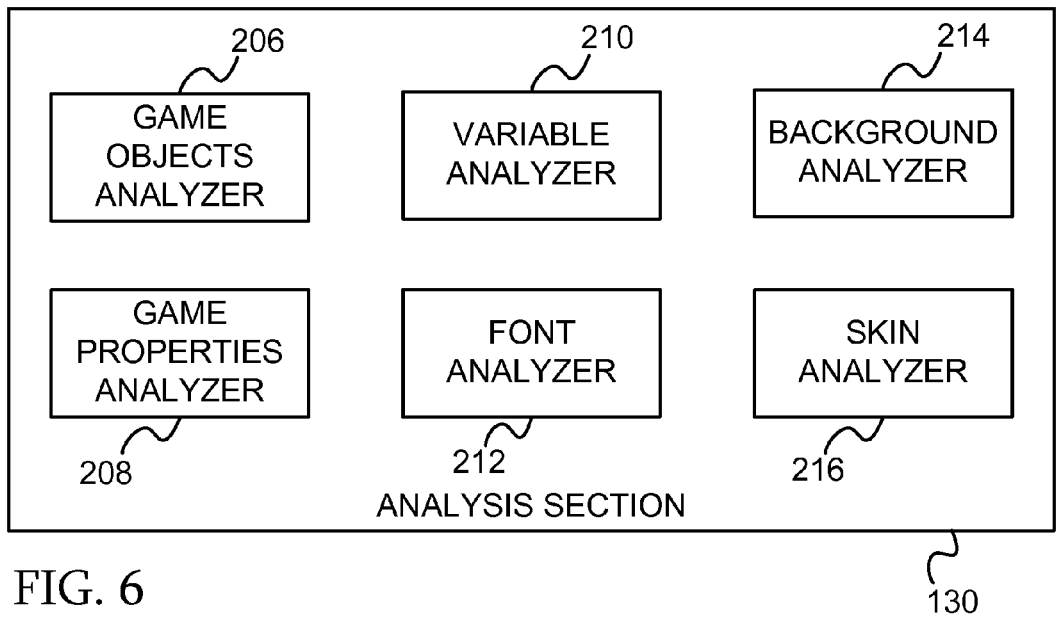
FIG. 6 is a detailed block diagram of an analysis section in the data center shown in FIG. 3, in accordance with a disclosed embodiment of the invention.

Reference is now made to FIG. 6, which is a detailed block diagram of the analysis section 130 of the compilation management module 122 (FIG. 3), which is constructed and operative in accordance with a disclosed embodiment of the invention.

The parsed data structures of the game abstraction file are often highly complex, and there may be tight interdependencies between game components. Moreover, some components in the analysis section 130 are dependent of the reports generated by other components. In order to maximize the accuracy of the analysis, It is advisable to implement the analysis in multiple steps. For example, in one step, the compilation management module 122 detects unused functionality and directs the compiler to refrain from generating code for it. In a separate step unused game objects are detected, and the compiler directed to attempt to remove them from the data-structures. Were the two processes to run concurrently, code implementing a functionality that is only used by an unnecessary game object would be generated inappropriately, only to be removed when the game object is deleted during a subsequent optimization.

Upon completion of the above steps, the parsed data structures describe the complete functionality of the game. Still, these data structures may prove inefficient when attempting further optimizations. To better serve this purpose, a number of helper data-structures are created, and some data restructuring may occur. Examples include:

Construction of dependency graphs describing game object usage and event handling. All usage and dependencies of objects used in the game are analyzed and mapped. This allows for optimizations such as removal of unused logic from the generated game. This is handled by a module GameObjectsAnalyzer 206 in the compilation management module 122.

The dependencies of the game are mapped to capabilities of mobile telephones and the game engine being used. The game-engine is a set of libraries written in the language of the target run-time environment. The libraries provide the necessary services required by the alpha language, e.g., object management service, physics engine. The libraries can be modified or configured during the generation process in order to best match the designated platform. Using this mapping, the compiler is able to generate a "lean" game version by excluding all capabilities that are not relevant. This includes features of mobile telephones such as sounds, networking and storage capabilities, as well as engine contained capabilities such as movement paths, acceleration, etc. This phase is handled by a module GamePropertiesAnalyzer 208.

All modification points of variables and properties access are mapped. This allows for various code optimizations such as referring to the variable as a constant, thereby conserving memory. This is handled by a module VariablesAnalyzer 210.

The text displayed in the game is analyzed and mapped according to its font, and font characteristics such as color, style, and effects. This information combined with device specific display parameters, e.g., anti-aliasing support, is used to generate optimal text drawing routines for the game, while minimizing required memory usage. This is handled by a module FontAnalyzer 212.

Data Restructuring.

In some cases, the analyzers of the compilation management module 122 may directly modify the game's parsed data structures directly in the interest of code optimization. It will be recalled that the compilation management module 122 has been presented with device and user configuration information. Its analyzers are the first components in the compilation chain that are aware of device-specific characteristics and user-specific data. The game data structures were originally composed outside the compilation process, and are both user- and device-agnostic. Examples of data restructuring follow:

Background Downgrading. When the compilation targets a weak device and the source game contains complex backgrounds. A background analysis module BackgroundAnalyzer 214 evaluates the need for code or configuration changes in order to assure that images displayed during the game suit the target device's graphics capabilities. The module BackgroundAnalyzer 214 may resize the images, if necessary, to fit screen size, and modify the image's colors palette. The optimization process recognizes performance limitations of the device and the module BackgroundAnalyzer 214 may elect to downgrade the background by either simplifying it or replacing it completely with a solid color. Other optimizations may involve reducing bit depth, despite game support for a very large number of colors. The use of anti-aliasing, if available on the target device, may be limited by the module BackgroundAnalyzer 214.

Rotated image generation. Some target devices supply buggy implementations of rotation and minoring operations. In order to make the generated games run on such target devices, additional images in various rotation states are pre-generated and inserted into the game data structures. In order to keep the memory penalty to a minimum, a specialized analyzer is responsible to determine the need for rotation, and accordingly set a flag for generation of additional images to objects that are the target of rotation operations. This functionality is managed by a module SkinAnalyzer 216.

Code Generation.

Figure 7:
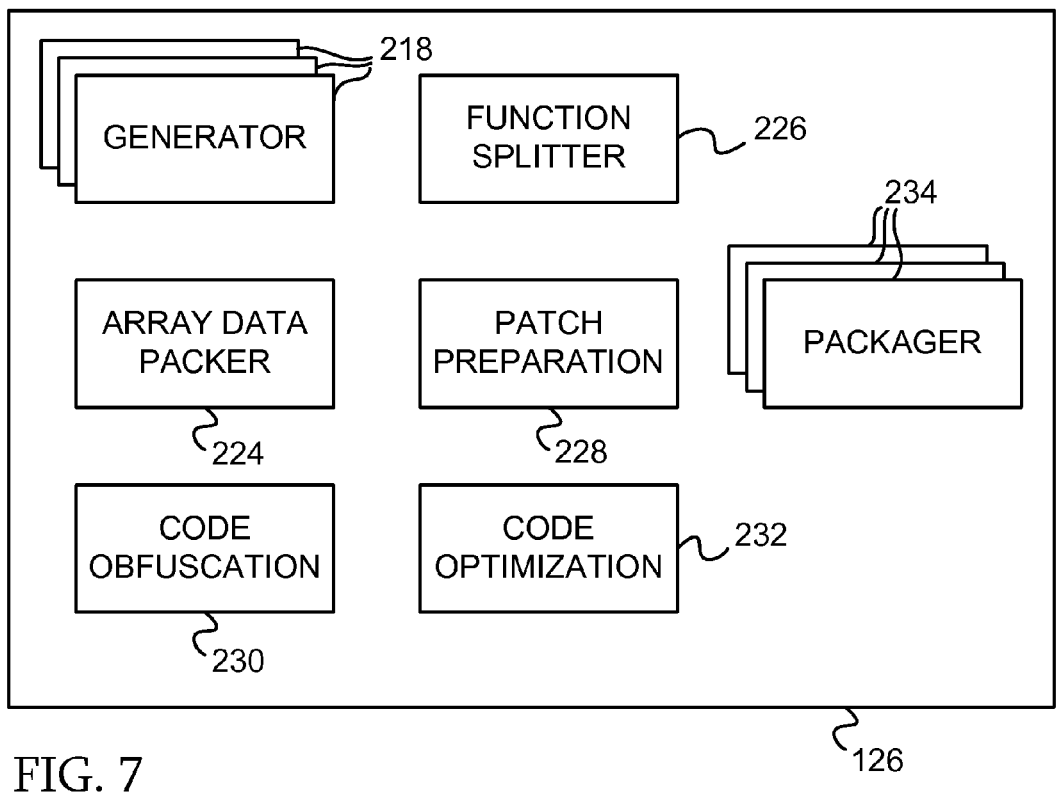
FIG. 7 is a detailed block diagram of an analysis section in the data center shown in FIG. 3, in accordance with a disclosed embodiment of the invention.

Reference is now made to FIG. 7, which is a detailed block diagram of the code generation section 126 of the compilation management module 122 (FIG. 3), which is constructed and operative in accordance with a disclosed embodiment of the invention.

Throughout the code generation phase of the compilation chain, device specific code is generated and compiled. This phase heavily relies on the end products of the analysis phase described above. The architecture of the code generation section 126 is based on an abstract code generator, which defines all required services. The current version implements a Java based code generator. However the emitted code need not be multi-platform Java code, but can be native code directly executable on the target device, or Java code optimized or specialized to a specific device.

The code generation section 126 comprises a plurality of code generators, shown representatively in FIG. 7 as code generators 218, 220, 222, which are selectable according to the nature of the target device. The code generators 218, 220, 222 are responsible for bridging the gap between the α-language used to describe the content in "game terms" and the generated code, which is required to run efficiently and generally does not resemble the α-language game specification. Each target platform, e.g., Java, Flash, Symbian, IPhone™, has a separate code generator implementation, in which the output code is capable of invoking necessary services on the target device. The group of code generators 218 are required, at minimum, to handle all functionality defined in a game's α-language specification. However, the code generators 218 may implement additional functionality that is relevant to the specific platform that it targets.

Storing binary data within code files such as java class files is inefficient and may even result in an application that cannot run on some devices. An array data packer 224 attempts to minimize this by packing binary data into external data files. By centralizing data management in this component, redundant storage of identical sequences can be merged and avoided completely. The array data packer 224.

Code that is generated from a high-level language by one of the code generators 218 may have some undesirable characteristics. An example is method size. It is desirable to avoid very large methods that may hinder performance. A function splitter 226 analyses the method on the compiled code and may to split it into smaller, separately loadable sections. Function splitting is device-dependent and is thus configured for device basis by the compilation management module 122. Its triggering parameter is limited by the device's general method size limitation and also influenced by device-specific performance characteristics, determined, for example, when a device configuration is constructed as explained above in the description of step 164 (FIG. 4).

It is a requirement of the code generation phase to make the generated code easily modifiable by the patcher 128 (FIG. 3). This is particularly useful for updating various personalization parameters, such as a unique user identifier typically used for online game score submissions, links to a developer's site that enable the user to obtain more games, and textual advertisements that may be embedded in the game. A specialized patch preparation module 228 verifies that a suitable interface exists that permits such updates to be made.

Before the generated content may be packaged, it goes through a process of code obfuscation and binary level modification. A code obfuscation module 230 modifies the generated code, using known obfuscation techniques to prevent analysis and reverse engineering by others.

A code optimization module 232 applies various binary level optimizations to the generated code. For example, in the case of java code, unused fields and methods are removed.

Packaging is the final stage of the compilation process, following which the generated content can be installed and run on the target device. The packaging stage is implemented using separate packaging modules 234 for each platform. The current implementation produces Java JAR files, and packages in the proprietary Blackberry COD file format.

Figure 8:
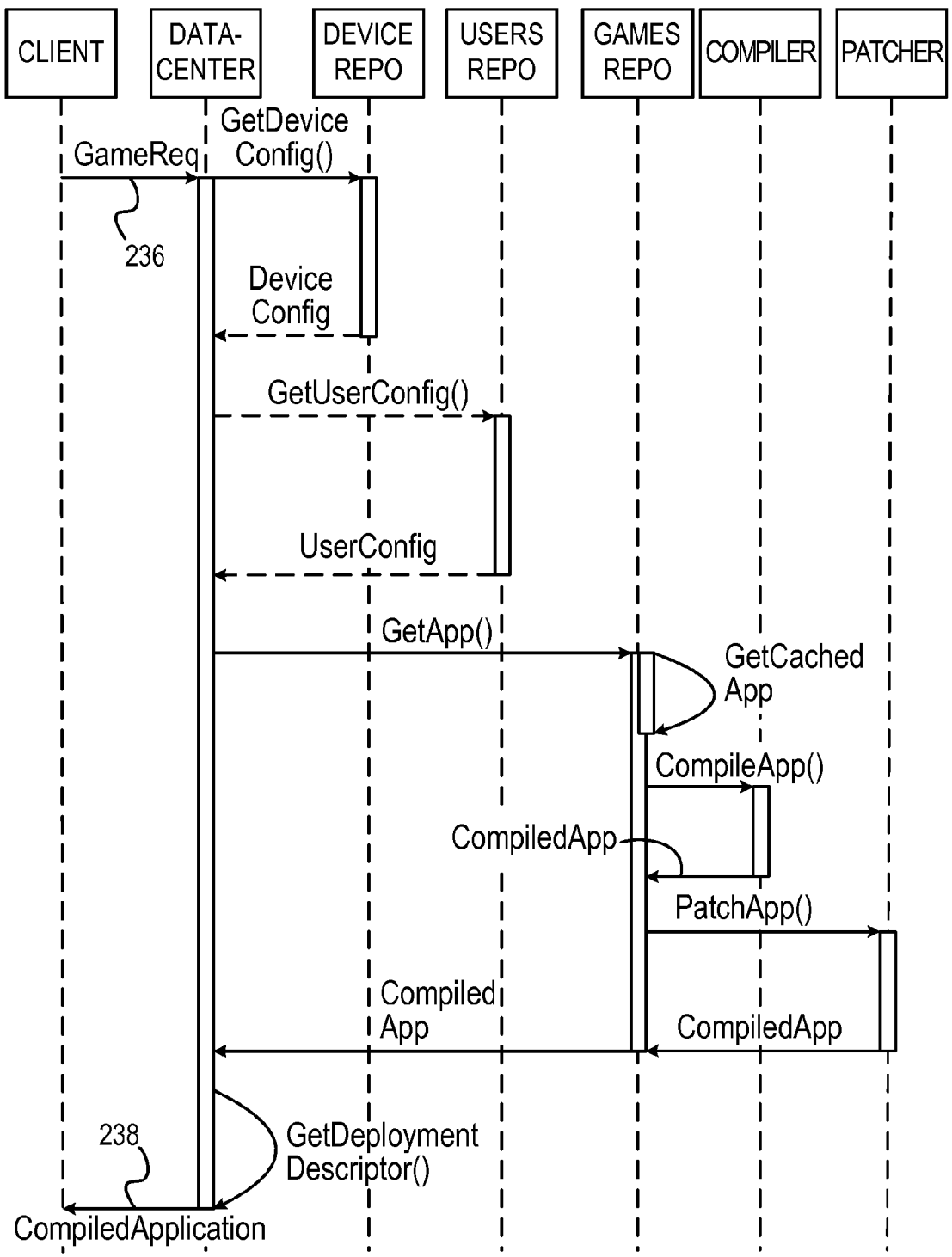
FIG. 8 is a sequence diagram summarizing the steps involved in compiling an application in response to a client request, in accordance with a disclosed embodiment of the invention.

Reference is now made to FIG. 8, which is a sequence diagram summarizing the steps involved in compiling an application in response to a client request, in accordance with a disclosed embodiment of the invention. The sequence begins with a client request at step 236 and ends with a delivery step 238 where a compiled application is returned to the client.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Computer Program Listings

Listing 1

```
TANK-TARGET (α-language example)
<!--\Definition of the Cannon Object's Logic-->
<Object name ="Cannon">
<Event type="Gesture" direction="Left">
    <Action type="Set Property">
       <AppliesTo>self</AppliesTo>
       <PropertyName>angle</PropertyName>
       <Value>1</Value>
       <Relative>true</Relative>
    </Action>
</Event>
<Event type="Gesture" direction="Right">
    <Action type="Set Proprerty">
       <AppliesTo>self</AppliesTo>         Cannon 103
       <PropertyName>angle</PropertyName>
       <Value>-1</Value>
       <Relative>true</Relative>
    </Action>
</Event>
<Event type="Gesture" direction="Up">
    <Action type="Set Property">
       <AppliesTo>self</AppliesTo>
       <PropertyName>strength</PropertyName>
       <Value>1</Value>
       <Relative>true</Relative>
    </Action>
</Event>
<Event type="Gesture" direction="Down">
    <Action type="Set Property">
       <AppliesTo>self</AppliesTo>
       <PropertyName>strength</PropertyName>
       <Value>-1</Value>
       <Relative>true</Relative>
    </Action>
</Event>
<Event type="Gesture" direction="Fire">
    <Action type="Shoot">
       <Type>CannonBall</Type>
        <Angle>self.angle</Angle>
        <Scalar>self.strength</Scalar>
    </Action>
</Event>
</Object>
<!--\Definition of the CannonBall Object's Logic-->
<Object name ="CannonBall">
 <Event type="Created">
    <Action type="Set Acceleration">
       <AppliesTo>self</AppliesTo>         CannonBall
       <Horizontal>0</Horizontal>          (cannon shell 104)
       <Vertical>-10</Vertical>
    </Action>
 </Event>
</Object>
<!--\Definition of the Mountain Object's Logic-->
<Object name ="Mountain">
   <Event type="Collision"
      with="CannonBall" Timing="Collision Start">
      <Action type="Destroy">                Mountain 108
      <AppliesTo>other</AppliesTo>
      <Effect>Explosion</Effect>
    </Action>
   </Event>
```

-continued

```
</Object>
<!--\Definition of the Target Object's Logic-->
<Object name ="Target"><Event type="Collision" with="CannonBall"
    Timing="Collision Start">
    <Action type="Destroy">
        <AppliesTo>other</AppliesTo>
        <Effect>Explosion</Effect>
    </Action>
    <Action type="ChangeSize">         Target 105
        <AppliesTo>self</AppliesTo>
        <Width>self.width/2</ Width >
        <Height >self.height/2</ Height>
        <SizingEffect>Gradual</Sizing>
    </Action>
    <Action type="Create">
</Event>
</Object>
```

Listing 2 (Game Descriptor)

ID
Name
AuthorID
Description
Path
Downloads
Version
Date
Rating
NumTimesRated
Plays Listing 3 (Delivery Data)

| | |
|---|---|
| DateTime | the time of the delivery |
| GameID | foreign key into the GameDecriptors table |
| ConfigurationID | foreign key into the BuildConfigurations table |
| CompilerVersion | the version of the compiler |
| DeviceID | foreign key into the Devices table |
| IP | the IP of the device |
| Price | the price of the delivered app |
| AffiliateID | Foreign key to the affiliates table |

Listing 4 (Compiled Games)

| | |
|---|---|
| GameID | foreign key into the GameDecriptors table |
| ConfigurationID | foreign key into the BuildConfigurations table |
| CompilerVersion | the version of the compiler compiling the game |
| Path | path to the compiled game data |

Listing 5 (Build Configurations)

| | |
|---|---|
| ID | the build configuration ID |
| Configuration | the build configuration content |

Listing 6 (Devices)

| | |
|---|---|
| ID | primary key |
| Model | |
| Vendor | |
| PlatformName | |
| DeviceEncoding | |
| Locale | |
| MaxHeapSize | |
| MaxAppSize | |
| Protocols | |
| FileFormats | |
| IsSymbian | |
| SymbianVersion | |
| IsJava | |
| JavaVersion | |
| JavaAPIs | |
| MIDP | |
| CLDC | |
| TotalMemory | |
| FreeMemory | |
| KeyMappings | a XML mapping abstracted actions to concrete virtual codes |
| MaxFormWidth | |
| MaxFormHeight | |
| MaxCanvasWidth | |
| MaxCanvasHeight | |
| DefaultCanvasWid | |
| DefaultCanvasHei | |
| IsCanvasDoublebu | |
| ScreenWidth | |
| ScreenHeight | |
| BitsPerPixel | |
| IsColor | |
| NumColors | |
| AlphaLevels | |
| IsApproved | |

Listing 7 (Device Issues)

| | |
|---|---|
| IssueID | foreign key to the KnownIssues table |
| DeviceID | foreign key to the Devices table |

Listing 8 (Known Issues)

| | |
|---|---|
| ID | primary key |
| Description | the description of the issue |

Listing 9 (User Repository)

Name
Surname
Gender
Country
State
City
Age
ISP_Carrier

-continued

| | |
|---|---|
| Tags | a list of textual tags that could be used when constructing embedded content (e.g., developer, surfer, artist) |

The invention claimed is:

1. A method for producing custom computer applications, comprising the steps of:
storing in an application distribution system specifications of the computer applications in a platform-independent language;
receiving signals at the application distribution system from a remote client device comprising a request for delivery of a specified application for execution on the remote client device by a customer;
interrogating the remote client device to construct a device configuration thereof, defining characteristics and capabilities of the remote client device, wherein interrogating the remote client device to construct the device configuration comprises:
running benchmark and application tests in order to discover characteristics of the remote client device; and
invoking a device fingerprinting subsystem to analyze results of the benchmark and application tests to identify device characteristics of the remote client device and responsively to the device characteristics to determine whether the remote client device can be associated with a known device configuration in a device repository; and
in an event that the device repository lacks the device configuration of the remote client device, adapting the device repository to the device configuration by storing the device configuration of the remote client device therein;
obtaining a user configuration of the customer, the user configuration comprising personal preferences of the customer;
establishing a compilation configuration according to the device configuration and the user configuration;
applying the compilation configuration to the platform-independent language of the specified application so as to create or modify a compiled application comprising user-specific and device-specific code in a binary format that is adapted to run on the remote client device and includes customized content compliant with the personal preferences expressed in the user configuration; and
downloading the compiled application to the remote client device.

2. The method according to claim 1, wherein interrogating the remote client device to construct the device configuration comprises:
identifying a user agent, a user agent profile and a user agent profile uniform resource identifier; and
the device fingerprinting subsystem is operative to establish a mapping of the user agent and the user agent profile uniform resource identifier, and to analyze the user agent profile to identify device characteristics of the remote client device and responsively to the mapping and the device characteristics to determine whether the remote client device can be associated with the known device configuration in the device repository.

3. The method according to claim 1, wherein the application distribution system comprises an application database storing respective device-independent application abstractions and compiled versions of the computer applications therein and an analysis module operative on the application abstractions to determine usages and dependencies of application objects thereof, a variables analysis module, a font analysis module, a background analysis module, and a skin analysis module, the method further comprising the steps of:
with the variables analysis module determining modification points in code of the application abstractions;
with the font analysis module, constructing a text map of text that may be displayed by execution of the specified application;
with the background analysis module determining a need to reconfigure the specified application so as to comply with graphics capabilities of the remote client device in the device configuration; and
with the skin analysis module determining, responsively to memory capabilities of the remote client device in the device configuration, a need for pre-generation of rotated images for insertion thereof into data structures of the specified application.

4. The method according to claim 1, wherein the application distribution system includes a plurality of code generators that generate code acceptable for installation and execution on different types of remote devices, respectively, wherein applying the compilation configuration comprises:
responsively to the compilation configuration, selecting one of the code generators; and
with the one of the code generators emitting generated code that comprises the compiled application of the specified application.

5. The method according to claim 4, wherein the generated code is an archive suitable for execution on the remote client device using a virtual machine.

6. The method according to claim 1, wherein obtaining the user configuration comprises executing a user fingerprinting subsystem operative to identify user characteristics of the customer and responsively to the user characteristics to select personalized content to be included in the compiled application.

7. The method according to claim 1, wherein applying the compilation configuration comprises invoking a patcher module to modify native executable code in an existing compiled version of the specified application to conform the existing compiled version to requirements of the compilation configuration.

8. The method according to claim 1, wherein applying the compilation configuration comprises the steps of:
identifying functions in the compiled application that exceed a threshold size, the threshold size being determined according to memory limitations of the remote client device that are included in the compilation configuration; and
invoking a function splitter module to divide the functions into a plurality of code sections, respectively.

9. The method according to claim 1, wherein applying the compilation configuration comprises invoking a code obfuscation module to obfuscate at least a portion of the compiled application to prevent analysis and reverse engineering by others.

10. An application distribution system for producing custom computer applications, comprising:
a processor;
a memory accessible to the processor storing programs and data objects therein, wherein the programs and data objects further comprise a device repository comprising configurations of known types of remote devices and a device fingerprinting subsystem, wherein execution of the programs causes the processor to perform the steps of:

storing specifications of the computer applications in a platform-independent language;

receiving signals from a remote client device comprising a request for delivery of a specified application for execution on the remote client device by a customer;

interrogating the remote client device to construct a device configuration thereof, comprising characteristics and capabilities of the remote client device, wherein interrogating the remote client device to construct the device configuration comprises:

running benchmark and application tests in order to discover characteristics of the remote client device; and invoking the device fingerprinting subsystem to analyze results of the benchmark and application tests to identify device characteristics of the remote client device and responsively to the device characteristics to determine whether the remote client device can be associated with a known device configuration in the device repository in an event that the device repository lacks the device configuration of the remote client device, adapting the device repository to the device configuration by storing the device configuration of the remote client device therein;

obtaining a user configuration of the customer, the user configuration comprising personal preferences of the customer;

establishing a compilation configuration according to the device configuration and the user configuration;

applying the compilation configuration to the platform-independent language of the specified application so as to create or modify a compiled application comprising user-specific and device-specific code in a binary format that is adapted to run on the remote client device and includes customized content compliant with the personal preferences expressed in the user configuration; and downloading the compiled application to the remote client device.

11. The application distribution system according to claim 10, wherein interrogating the remote client device to construct the device configuration further comprises:

identifying a user agent, a user agent profile and a user agent profile uniform resource identifier; and invoking the device fingerprinting subsystem to establish a mapping of the user agent and the user agent profile uniform resource identifier, and to analyze the signals user agent profile to identify device characteristics of the remote client device and responsively to the mapping and the device characteristics to determine whether the remote client device can be associated with the known device configuration in the device repository.

12. The application distribution system according to claim 10, wherein the programs and data objects further comprise an application database storing respective device-independent application abstractions and compiled versions of the computer applications therein, an analysis module operative on the application abstractions to determine usages and dependencies of application objects thereof, a variables analysis module, a font analysis module, a background analysis module, and a skin analysis module, the processor operative to perform the further steps of:

invoking the variables analysis module to determine modification points in code of the application abstractions;

invoking the font analysis module, to construct a text map of text that may be displayed by execution of the specified application;

invoking the background analysis module to determine a need to reconfigure the specified application so as to comply with graphics capabilities of the remote client device in the device configuration; and invoking the skin analysis module to determine, responsively to memory capabilities of the remote client device in the device configuration, a need for pre-generation of rotated images for insertion thereof into data structures of the specified application.

13. The application distribution system according to claim 10, wherein the programs and data objects further comprise a plurality of code generators that generate code acceptable for installation and execution on different types of remote devices, respectively, wherein applying the compilation configuration comprises:

responsively to the compilation configuration, selecting one of the code generators; and with the one of the code generators emitting generated code that comprises the compiled application of the specified application.

14. The application distribution system according to claim 13, wherein the generated code is an archive suitable for execution on the remote client device using a virtual machine.

15. The application distribution system according to claim 10, wherein the programs and data objects further comprise a user fingerprinting subsystem and the processor is operative to invoke the user fingerprinting subsystem to identify user characteristics of the customer and responsively to the user characteristics to select personalized content to be included in the compiled application.

16. The application distribution system according to claim 10, wherein the programs and data objects further comprise a patcher module, wherein the processor is operative to invoke the patcher module to modify native executable code in an existing compiled version of the specified application to conform the existing compiled version to requirements of the compilation configuration.

17. The application distribution system according to claim 10, wherein the programs and data objects further comprise a function splitter module, wherein the processor is operative to perform the additional steps of:

identifying functions in the compiled application that exceed a threshold size, the threshold size being determined according to memory limitations of the remote client device that are included in the compilation configuration; and invoking the function splitter module to divide the functions into a plurality of code sections, respectively.

18. The application distribution system according to claim 10, wherein the programs and data objects further comprise a code obfuscation module, wherein the processor is operative to invoke the code obfuscation module to obfuscate at least a portion of the compiled application to prevent analysis and reverse engineering by others.

19. A computer software product for producing custom computer applications, including a non-transitory computer storage medium in which computer program instructions are stored, which instructions, when executed by a computer, cause the computer to perform the steps of:

storing in an application distribution system specifications of the computer applications in a platform-independent language;

receiving signals at the application distribution system from a remote client device comprising a request for delivery of a specified application for execution on the remote client device by a customer;

interrogating the remote client device to construct a device configuration thereof, defining characteristics and capabilities of the remote client device;

maintaining a device repository comprising configurations of known types of remote devices, wherein interrogating the remote client device to construct the device configuration comprises:

executing a device fingerprinting subsystem operative for running benchmark and application tests in order to discover characteristics of the remote client device; and invoking the device fingerprinting subsystem to analyze results of the benchmark and application tests to identify device characteristics of the remote client device and responsively to the device characteristics to determine whether the remote client device can be associated with a known device configuration in the device repository;

in an event that the device repository lacks the device configuration of the remote client device, adapting the device repository to the device configuration by storing the device configuration of the remote client device therein;

obtaining a user configuration of the customer, the user configuration comprising personal preferences of the customer;

establishing a compilation configuration according to the device configuration and the user configuration;

applying the compilation configuration to the platform-independent language of the specified application so as to create or modify a compiled application comprising user-specific and device-specific code in a binary format that is adapted to run on the remote client device and includes customized content compliant with the personal preferences expressed in the user configuration; and downloading the compiled application to the remote client device.

20. The computer software product according to claim 19, the device fingerprinting subsystem is operative for:

identifying a user agent, a user agent profile and a user agent profile uniform resource identifier;

invoking the device fingerprinting subsystem to establish a mapping of the user agent and the user agent profile uniform resource identifier, and to analyze the user agent profile to identify device characteristics of the remote client device; and responsively to the mapping and the device characteristics to determine whether the remote client device can be associated with the known device configuration in the device repository.

21. The computer software product according to claim 19, wherein the application distribution system comprises an application database storing respective device-independent application abstractions and compiled versions of the computer applications therein, and wherein the instructions are organized into distinct software modules including an analysis module operative on the application abstractions to determine usages and dependencies of application objects thereof, a variables analysis module, a font analysis module, a background analysis module, and a skin analysis module, wherein the instructions cause the computer to perform the additional steps of:

with the variables analysis module determining modification points in code of the application abstractions;

with the font analysis module, constructing a text map of text that may be displayed by execution of the specified application;

with the background analysis module determining a need to reconfigure the specified application so as to comply with graphics capabilities of the remote client device in the device configuration; and with the skin analysis module determining, responsively to memory capabilities of the remote client device in the device configuration, a need for pre-generation of rotated images for insertion thereof into data structures of the specified application.

22. The computer software product according to claim 19, wherein the application distribution system includes a plurality of code generators that generate code acceptable for installation and execution on different types of remote devices, respectively, wherein applying the compilation configuration comprises:

responsively to the compilation configuration, selecting one of the code generators; and with the one of the code generators emitting generated code that comprises the compiled application of the specified application.

23. The computer software product according to claim 22, wherein the generated code is an archive suitable for execution on the remote client device using a virtual machine.

24. The computer software product according to claim 19, wherein obtaining the user configuration comprises executing a user fingerprinting subsystem operative to identify user characteristics of the customer and responsively to the user characteristics to select personalized content to be included in the compiled application.

25. The computer software product according to claim 19, wherein the instructions are organized into distinct software modules including a patcher module, wherein the instructions cause the computer to invoke the patcher module to modify native executable code in an existing compiled version of the specified application to conform the existing compiled version to requirements of the compilation configuration.

26. The computer software product according to claim 19, wherein the instructions are organized into distinct software modules including a function splitter module, wherein the instructions cause the computer to perform the additional steps of:

identifying functions in the compiled application that exceed a threshold size, the threshold size being determined according to memory limitations of the remote client device that are included in the compilation configuration; and invoking the function splitter module to divide the functions into a plurality of code sections, respectively.

27. The computer software product according to claim 19, wherein the instructions are organized into distinct software modules including a code obfuscation module, wherein the instructions cause the computer to invoke the code obfuscation module to obfuscate at least a portion of the compiled application to prevent analysis and reverse engineering by others.

* * * * *